June 7, 1932.  A. H. GREENE  1,861,854
EGG METER
Filed Feb. 11, 1929
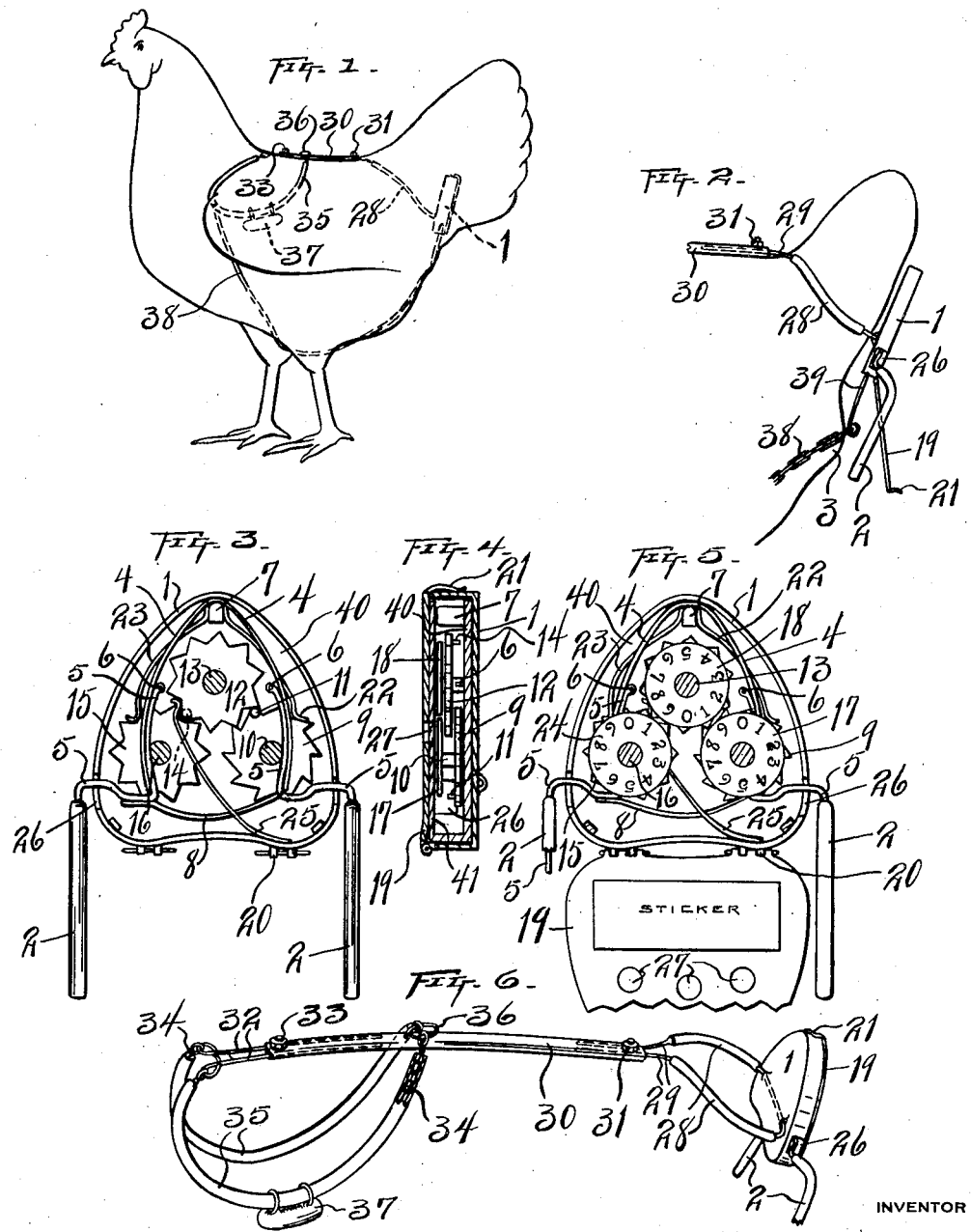
INVENTOR
A. H. GREENE,
BY
*A. D. Jackson,*
ATTORNEY Patented June 7, 1932

1,861,854

UNITED STATES PATENT OFFICE

ALONZO H. GREENE, OF FORT WORTH, TEXAS, ASSIGNOR TO FORT WORTH NATIONAL BANK OF FORT WORTH, TEXAS, OF FORT WORTH, TEXAS, A CORPORATION, AS TRUSTEE

EGG METER

Application filed February 11, 1929. Serial No. 339,137.

My invention relates to egg meters and more particularly to devices to be worn or carried by fowls for registering each egg and giving the total number of eggs that each fowl lays; and the object is to provide a simple device to be worn by the hens or other fowls for accurately counting all the eggs laid by a hen or other fowl and which can be worn by the fowls without injuring or hurting the bodies of the fowls and without making the fowls uncomfortable, and which will not hinder or obstruct the movements of the fowls. The advantage of such counting devices is that poultry raisers or dealers may know how many eggs each fowl lays and this will be useful information for poultry breeders and commercial egg producers. Other objects and advantages are fully explained in or apparent from the following description of a preferred embodiment of egg meter shown in the drawing forming a part of the specification and illustrative of my invention and the scope of my invention is more particularly pointed out in the claims.

Similar characters of reference are used to indicate the same parts throughout the several views.

Fig. 1 is a side elevation of a hen provided with a registering meter for the eggs which she lays.

Fig. 2 is a detail view of the egg-actuated levers to be actuated during the discharge of an egg.

Fig. 3 is a rear elevation of the levers to be actuated by the passage of eggs and the registering mechanism actuated by the levers.

Fig. 4 is a vertical cross-section of the registering mechanism.

Fig. 5 is similar to Fig. 3, but showing a cover for the registering devices having means for identifying the meter, shown as a suitable indicia bearing sticker.

Fig. 6 is a perspective view of the devices to be actuated by the passage of eggs and the means for mounting the devices on a hen.

Similar characters of reference are used to indicate the same parts throughout the several views.

A registering device 1 is mounted on the rear end of the hen just above the egg passage. The registering device 1 is to be actuated by a pair of lever arms 2 which are preferably covered with some soft material, such as rubber or felt. These levers project into the casing 1 of the registering device and depend on each side of the egg passage and are close enough to be actuated outwardly by the passage of an egg. The levers 2 are supported by the casing of the register.

The register is mounted on the hen and held in place while in service by a retaining harness, preferably comprising a tail stump surrounding portion and a body harness extending between the legs of the hen, both attached to the register casing and attached to one another on top of the hen's body, by means of a back frame. In the frame shown the tail stump surrounding portion comprises a wire 29 run through the casing 1 (see Fig. 6). Portions of the wire are covered with soft material 28 and the ends of the wire are projected into a flat bar or back-strip 30 constituting the backbone of the back frame and are clamped therein by a bolt and nut 31. The back frame may also comprise wires 32 projected into the front end of the bar 30 and clamped therein by a bolt and nut 33, and these wires 32 may be doubled upon themselves as shown to form loops in their front ends. The back frame may also be provided with wing embracing means if this is desirable, and in the form shown such means are provided by wires or chains 34 respectively caught in the loops of the wires 32 and bent around under the hen's wings and caught in a loop 36 which is attached on top of the bar 30. The bar 30 and wires or chains 34 may be covered with soft material 35 to keep them from hurting the hen. The body harness in the form shown comprises a cord or chain 38 attached to the back frame, to which it is secured in the form shown by attachment to the wire or chain 34, and as above mentioned, this body harness extends backwardly under the hen and is attached to a wire 39 which is attached to the casing 1. This construction and arrangement will hold the register securely in place without injuring or making the hen uncomfortable.

The registering mechanism includes the wires 5 which project approximately horizontally in the casing 1 and then upwardly and are pivotally connected to the casing at 6. A base 40 is provided in the casing 1 for anchoring the working parts of the registering mechanism. A block 7 is attached to the base 40 and a spring 4 is mounted on the block 7 and the arms of the spring come down in the casing and bear against the arms 5 to aid these arms in performing their proper function by bringing the arms 5 and levers 2 back to normal positions after the passage of an egg through the passage or vent 3. A spring 8 is attached to the arm 5 on the left side and this spring moves the wheel 9 one tooth to count one egg every time an egg passes. The arms 5 rest against the spindles 10 and 16 of the registering wheels 9 and 15. A spring having arms 22 and 23 is mounted on the block 7. The arm 22 bears yieldingly against the teeth of the wheel 9 and prevents accidental turning of the wheel and the arm 23 performs a similar function for wheel 15. A spring arm 25 is attached to the base 40 and performs the same kind of function on the wheel 12.

Each time that an egg passes between the lever arms 2 these lever arms are spread apart. The outward motion of the levers 2 draws outwardly the arms 5, turning them about their pivots 6. As the arm 5 carrying the spring 8 is moved outwardly, the ratchet wheel 9 being held stationary by the spring detent 22, the spring 8 is drawn from the previously engaged notch in the ratchet wheel 9 and snaps into the succeeding notch. Then when the egg has passed between the levers 2 and the arms of spring 4 return these levers and the arms 5 to their initial positions, the spring 8 will advance the ratchet wheel one notch, registering one egg. Assuming the register to have been originally set at zero, the first nine actuations of the wheel 9 will turn that wheel only, but on the passage of the tenth egg, a pin or actuator 11, carried by the wheel 9, engages the wheel 12, moving it one notch under its spring detent 25, and as the wheels are preferably provided with but 10 notches numbered from zero to nine the wheel 9 will be returned to its zero position. After 99 eggs have passed between the levers 2 the wheel 12 will have been actuated nine times, and the actuator 11 on the wheel 9 will be in position to move the wheel 12 for the tenth time at the next passage of an egg. On the passage of this 100th egg, a pin or actuator 14, carried by the wheel 12, will move the wheel 15 one notch under its spring detent 23, while both wheels 12 and 9 are moved to their initial zero positions. Using three wheels 9, 12 and 15 as shown, the registering mechanism shown will count up to 999 eggs and on the registering of the 1000th egg all three wheels will be returned to their inital zero positions. Obviously, however, the registering mechanism shown is not the only type which can be used in an egg meter according to my invention, and while the features of the registering mechanism shown are a part of the preferred embodiment of my invention, in its broader aspects my invention is not limited to any particular registering mechanism.

The registering device is provided with a cover 19 which is hingedly connected thereto and held closed by a locking device 21. As above mentioned suitable means for identifying the meter may be provided, constituted, in the form shown, by an indicia bearing sticker applied to the interior of the cover where it will be protected from wear and tear when the cover is closed (see Fig. 5). The registering wheels are provided with disks on which numbers are placed for showing the number of turns of each wheel. The disks 17, 18, and 24 are rigid respectively with the spindles 10, 13, and 16 and the lid 19 has perforations 27 for inspection of the disks. The casing 1 has notches 26 for the passage of the arms 5. A box 37 may be attached to an arm 35 for carrying an antiseptic.

The spindles 10, 13, and 16 are journaled in the base plate 40 and the cap plate 41 and these two plates serve to hold the registering mechanism as a unit.

It is preferable to make the spring 5 on the left, as shown in the drawing weaker than the spring on right for the reason that a smaller size egg will be registered by pressing the spring on the left the required distance to let an egg pass and this action will cause the spring 8 to move the wheel 9. But if the egg is larger the device will operate in the same manner as the spring on the right will commence to yield after the spring on the left has gone to its limit.

Obviously my invention is not restricted to the specific embodiment herein disclosed to illustrate the same, but comprises broadly the features and devices set forth in the following claims.

What I claim, is:—

1. An egg meter adapted to be positioned adjacent the egg vent of a bird comprising a casing, registering mechanism within said casing, laterally movable egg displaceable levers extending from said casing in position to lie on opposite sides of said vent when said meter is positioned, and means interconnecting one of said levers and said registering mechanism so that lateral displacement of said lever by an egg passing between said levers will actuate said registering mechanism.

2. An egg meter comprising a casing, means for positioning and retaining said casing adjacent to and spaced from the axis of the egg vent of a bird, registering mechanism within said casing, a laterally movable egg displaceable lever extending exteriorly of said casing in position to lie adjacent one side of said vent when said meter is positioned, a second egg contactable lever extending exteriorly of said casing in position to lie adjacent the opposite side of said vent, and means for causing said registering mechanism to register the lateral displacements of said first lever.

3. An egg meter attachment comprising a register casing adapted to be positioned between the tail feathers of a hen, a retaining harness comprising a tail-stump surrounding portion attached to said casing and body harness portions attached to said stump surrounding portion, extending about the body of the bird and rearwardly between the legs, and attached to said casing to securely hold the same in place, a registering mechanism within said casing, a laterally movable lever arm depending from said casing to lie adjacent one side of the egg vent of the hen when said casing is positioned, a second arm depending from said casing to lie adjacent the other side of the egg vent when said casing is positioned, said arms defining a space of less width than the normal width of an egg but enlargeable to allow passage of an egg therethrough, and means connecting said laterally movable arm with said registering mechanism for causing said mechanism to register the movement of said arm caused by the passage of an egg.

4. In an egg meter attachment, a casing means for positioning and retaining said casing between the tail feathers and above the egg vent of a hen, arms depending from said casing defining a passage therebetween of less width than the normal diameter of an egg, one of said arms being adapted to be moved laterally by an egg being laid to allow passage of said egg between said arms, and registering means in said casing connected to be actuated by the lateral movement of said arm, substantially as and for the purpose described.

5. In an egg meter adapted to be positioned adjacent the egg vent of a bird, a register comprising a registering mechanism, and actuating means for said register comprising a laterally movable egg displaceable arm extending from said register in position to lie adjacent one side of said vent when said meter is positioned, a second egg contactable arm extending from said register in position to lie adjacent the opposite side of said vent, and means for causing said registering mechanism to register the lateral displacements of said first named arm.

6. In an egg meter adapted to be positioned adjacent the egg vent of a bird, a register comprising a registering mechanism, and actuating means for said register comprising a laterally movable egg displaceable arm extending from said register in position to lie adjacent one side of said vent when said meter is positioned, a second movable egg contactable arm extending from said register in position to lie adjacent the opposite side of said vent, relatively easily yieldable means resisting displacement of said first arm, relatively less easily yieldable means resisting displacement of said second arm and means for causing said registering mechanism to register the lateral displacements of said first arm, substantially as and for the purposes described.

7. In an egg meter adapted to be positioned adjacent the egg vent of a bird, a register comprising a registering mechanism, and actuating means for said register comprising a laterally movable egg displaceable arm extending from said register in position to lie adjacent one side of said vent when said meter is positioned, a second movable egg contactable arm extending from said register in position to lie adjacent the opposite side of said vent, relatively light spring means resisting displacement of said first arm, relatively heavy spring means resisting movement of said second arm, and means for causing said registering mechanism to register the lateral displacements of said first arm, substantially as and for the purposes described.

8. An egg meter adapted to be positioned adjacent the egg vent of a bird comprising a casing, registering mechanism within said casing, laterally movable egg displaceable lever arms extending from said casing in position to lie on opposite sides of said vent when said meter is positioned, one of said lever arms being more readily displaceable than the opposite lever arm, and means connecting said more readily displaceable lever arm with said registering mechanism for actuating the same, substantially as and for the purposes described.

9. An egg meter attachment comprising a register casing to fit between the tail feathers of a hen, a retaining harness for holding said casing rigidly in such position comprising a tail-stump gripping portion attached to said casing and a body harness attached to said tail-stump gripping portion and to said casing for extending about the body of the hen and rearwardly between the legs, registering means within said casing, and an actuating member for said registering means extending from said casing in position to lie adjacent the egg vent of the hen to be moved laterally with respect thereto by the venting of an egg.

10. An egg meter comprising a registering mechanism housed in a casing, means for retaining said casing stationarily positioned between the tail feathers of an egg laying bird above its egg vent, and actuating means for said registering mechanism comprising a lever depending therefrom and projecting below said casing to lie adjacent the egg vent of the bird to be moved laterally with respect thereto by the passage of an egg through said vent.

11. In an egg meter, a pair of arms positionable to lie on opposite sides of the egg vent of an egg laying bird, defining a space of less width than the normal width of an egg, one of said arms being movable away from the other to widen the defined space therebetween and allow passage of an egg therethrough, and means for registering the lateral movements of said arm.

In testimony whereof, I set my hand, this 31st day of December, 1928.

ALONZO H. GREENE.